Feb. 4, 1941.　　　J. W. WHITE　　　2,230,419
BRAKE ACTUATOR
Original Filed Sept. 16, 1935　　2 Sheets-Sheet 1

INVENTORS
JOHN WILLIAM WHITE
BY
Blackmore, Spencer & Flint
ATTORNEYS

Feb. 4, 1941.  J. W. WHITE  2,230,419
BRAKE ACTUATOR
Original Filed Sept. 16, 1935   2 Sheets-Sheet 2

INVENTORS
JOHN WILLIAM WHITE

Patented Feb. 4, 1941

2,230,419

UNITED STATES PATENT OFFICE 2,230,419

BRAKE ACTUATOR

John William White, South Bend, Ind., assignor, by mesne assignments, to Bendix Products Corporation, a corporation of Indiana Application September 16, 1935, Serial No. 40,789
Renewed April 24, 1937

16 Claims. (Cl. 60—54.6)

The invention relates to manually operated brake actuators and it is the primary object of the invention to obtain a construction in which the leverage is varied according to load. In the operation of brake systems on motor vehicles a portion of the movement of the brake system is required for taking up lost motion and clearance of the braking means, while the final movement applies the braking pressure. The degree of pedal movement required before braking pressure is applied depends on various conditions such as lost motion between the elements of the transmission means, the condition of the brake linings and other factors. Thus any variable leverage actuator in which the change of leverage is in fixed relation to the movement of the pedal is unsatisfactory. On the other hand, with hydraulic systems where the change in leverage is controlled by fluid pressure supplied from a plurality of master cylinders alternatively operated, such control is unsatisfactory, as there is an interval during the change of one cylinder to the other in which the fluid pressure is permitted to drop.

In view of the defects in systems previously used and as above described, I have devised an actuator capable of changing from low to high power, such change being dependent solely upon load or reaction from the braking means. I have further devised a construction of hydraulic master cylinder provided with low and high pressure cylinders and pistons, together with means for shifting from one cylinder to the other, controlled by load reaction. The invention therefore consists in the construction as hereinafter set forth.

Figure 1:
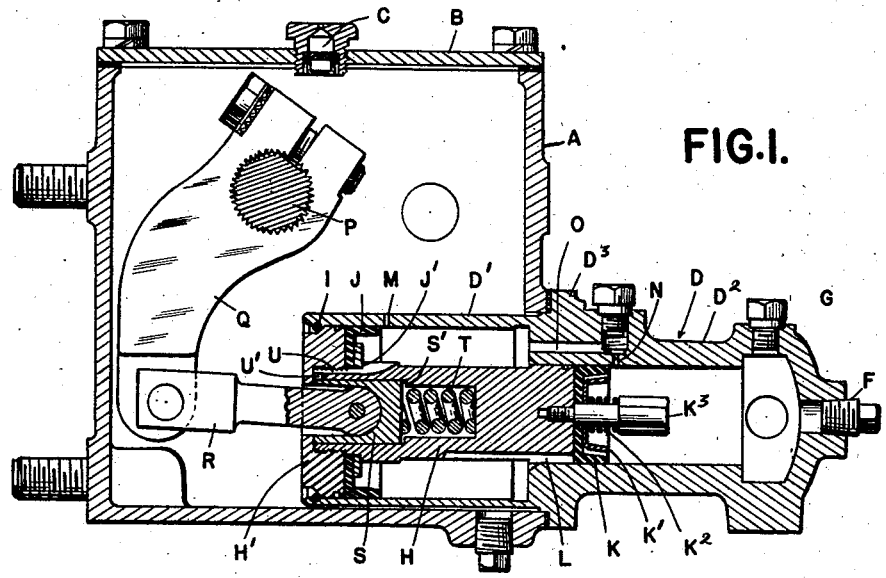
Fig. 1 is a vertical longitudinal section through an hydraulic brake actuator.
Figure 2:
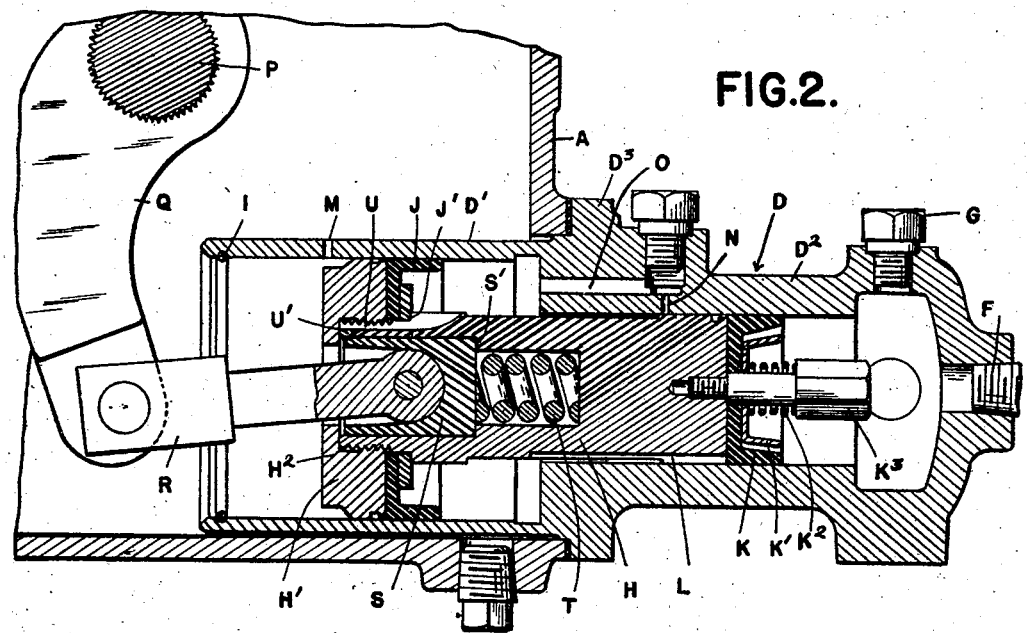
Fig. 2 is a similar enlarged view showing the position of parts when changing from low to high leverage.

With the construction shown in Figs. 1 and 2, A is a tank or reservoir for the actuating fluid which is provided with a removable cover B and a breather valve C for permitting ingress and egress of air to the reservoir according to displacement. D is a cylinder member, a portion D' of which is inserted through an aperture in the wall of the tank A, while another portion $D^2$ projects outward therefrom. This member is secured to the tank by a flange $D^3$ surrounding the opening.

The portion D' forms a large bore cylinder and the portion $D^2$ a cylinder of smaller bore. The latter portion is connected at its forward end with a conduit F leading to the brake applying mechanism (not shown). It is also provided with a fill opening which is normally closed by a plug G. Within these cylinders is a piston H, the body portion of which is of a diameter to engage the small cylinder $D^2$, while a head H' secured to the rear end of the portion H is of a size to fit the large cylinder D'. The piston is inserted into the cylinders through the rear end of the portion D' and a stop ring I engaging an annular groove in the cylinder D' serves to prevent disengagement. The head H' is provided with a sealing cup J which is clamped against an annular flange J' by the head H', the latter having a threaded engagement with the member H. The member H is also provided with a sealing cup K fitting within the cylinder $D^2$ and yieldably held in position by a cupped washer K' and a spring $K^2$ mounted on a securing bolt $K^3$. The periphery of the member H is longitudinally channeled as indicated at L so as to permit under certain conditions passage of liquid from the large cylinder D' to the small cylinder $D^2$ and past the sealing cup K. The large cylinder D' has a port M which in the normal retracted position of the piston is uncovered by the sealing cup J and establishes liquid communication between the reservoir A and the interior of the cylinder D'. There is also a similar port N in the cylinder $D^2$ uncovered by the sealing cup K and communicating with a passage O which leads into the cylinder D'.

Movement of the piston within the cylinder is accomplished by a rock shaft P extending across and within the reservoir A, a rock arm Q mounted on said shaft and a connecting rod R between said rock arm and the piston H. The rod R is not, however, directly connected to the piston H, but is pivoted to a block S slidable in a recess within the piston and bearing against a spring T located in an extension of this recess. The arrangement is such that normally the block S bears against the end of the spring T through which movement of the rock arm is transmitted to the piston, but when the pressure or load upon the piston exceeds a predetermined amount, the spring T will yield and permit the block S to move forward in its recess until arrested by a shoulder S'. The block S constitutes a valve which is normally seated on an annular flange $H^2$ of the head H' but after compression of the spring T, is moved away from this seat. U is a channel connecting the interior of the cylinder D' with an annular channel U' surrounding the block S, these channels permitting discharge of liquid from the cylinder D' whenever the valve block S is unseated. The rock shaft P is connected with the actuating pedal (not shown).

Operation

With the construction as described, whenever the piston is actuated by the rock shaft P and its connections, the initial movement will carry the sealing cups J and K respectively beyond the ports N and M. Further movement will displace fluid from both cylinders D' and D². The fluid from the cylinder D' will pass through the channels L to the sealing cup K which will be bent forward to permit of the passage of the fluid into the cylinder D². The fluid in the cylinder D² will be displaced by the piston H into the conduit F which leads to the brake mechanism. This operation will continue until reaction of the braking mechanism will build up pressure in the line and in the cylinder D² sufficient to overcome the tension of the spring T. When this occurs, the block S will move within its recess in the piston H compressing the spring T and also unseating the rear face of the block from the flange H². This will open communication between the interior of the cylinder D' and the reservoir A, permitting fluid displaced by the piston to pass through the channels U and U' back into the reservoir. While this is occurring, the cup K will seal in the cylinder D² so that all liquid therein will be displaced into the conduit F. Inasmuch, however, as the area of the piston H and cup K is much smaller than the area of the piston H', the same pressure of the actuating pedal will develop much higher fluid pressure within the system.

Figure 3:
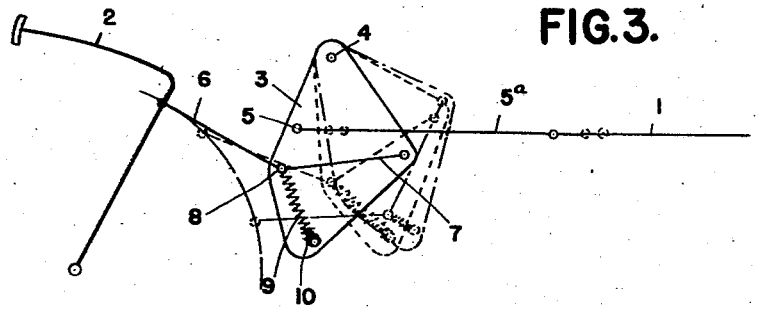
Fig. 3 is a diagram illustrating a mechanical actuator provided with load controlled variable leverage.

While I preferably employ an hydraulic actuator such as above described, the same effect may be produced in a mechanical system. Thus as shown in Fig. 3, 1 is a rod for transmitting the braking force to the brake mechanism (not shown) through any suitable mechanical means. This rod 1 is actuated from a pedal 2 through the medium of a variable leverage intermediate mechanism. As shown, this mechanism comprises a rockable member 3 pivoted at 4 and also pivotally connected at 5 to a link 5ᵃ connected to the rod 1. The pedal 2 is connected to the rockable member 3 through the medium of toggle levers 6 and 7. These are arranged at such an angle that the force produced by the pressure of the pedal will have a lateral component tending to swing the pivotal joint 8 between said levers in a direction away from the pivot 8 of the member 3. A spring 9 is interposed between this pivotal joint and an abutment 10 on the member 3, so that any lateral deflection of the toggle levers will be resisted by the compression of this spring. With this arrangement the initial movement of the pedal 2 will be transmitted to the member 3 through the links 6 and pivot joint 8, the leverage being determined by the relative lengths from the fulcrum 4 of the pivotal points 5 and 8. This ratio of leverage will continue until the load on the rod 1 is increased to a point where the spring 9 will be compressed, permitting the links 6 and 7 to swing outward and lengthen the distance between the pivotal joint 8 and the fulcrum 4. Thus the power of the pedal will be increased and the amount of movement of the rod 1 relative to the movement of the pedal will be correspondingly diminished.

The essential and common feature of both constructions above described is that increase in load will proportionately increase power and the load is accurately measured by the compressible spring. It is therefore apparent that this change in leverage does not take place at any definite point in the movement of the pedal, but only when resistance has been built up to exceed some predetermined low limit. It is also apparent that with the hydraulic actuator all fluid displaced into the system must pass through the small cylinder and that the cup K of the piston for the small cylinder will instantaneously seal when fluid pressure in the large cylinder is unloaded by movement of the valve block S away from its seat. If, however, the escape of fluid from the large cylinder decreases the load upon the piston and through the latter upon the spring T, this spring will instantaneously expand to close the valve port and to restore pressure within the large cylinder. Thus the valve block S will either assume a position for restricting the unloading of fluid from the large cylinder, or it will flutter between a fully open and fully closed position so as to produce the same effect, viz: the continuance of the load upon the pedal during the entire movement thereof.

Figure 4:
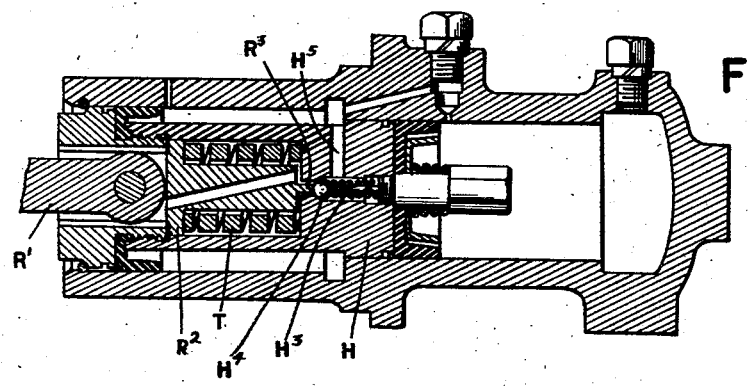
Fig. 4 is a view similar to a portion of Fig. 1 showing a modified construction of unloading means.
Figure 5:
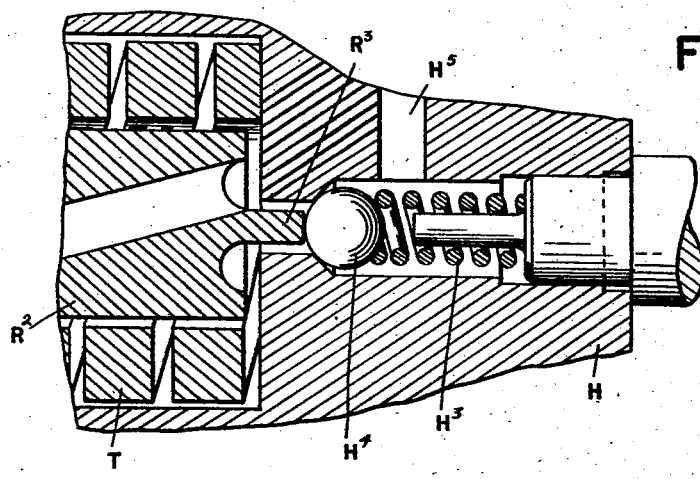
Fig. 5 is a similar view on a larger scale.

Figs. 4 and 5 show a modified construction of unloading means for the large cylinder. In this construction the piston H has an axial port H³ controlled by a check valve H⁴ and in communication with a lateral port H⁵ opening into the cylinder. The rod R' is pivotally connected to a block R² slidable within a recess in the piston and with the spring T interposed between this block and the piston. The block R² has a pin R³ projecting into proximity to the valve H⁴ but normally out of contact therewith. When, however, the spring T is compressed, the pin R³ will unseat the valve H⁴, thereby permitting discharge of fluid from the cylinder through the passages H⁵ and H⁴.

What I claim as my invention is:

1. A brake actuator comprising connected cylinders of different diameters, the small cylinder being connected to the brake system, a piston structure comprising connected pistons in said cylinders, the piston in the large cylinder displacing the fluid therefrom into the small cylinder, means permitting the fluid displaced from the large cylinder to pass the piston in the small cylinder in the direction of movement thereof but preventing passage in the reverse direction, actuating means for said pistons, a member mounted for limited movement relative to piston structure and engaged by said actuating means, yielding means between said piston structure and one end of said member, said other end of said member and said piston structure constituting a seal whereby under low pressure conditions the piston structure may be advanced with the seal closed and upon the development of a predetermined pressure the member may move to overcome the yielding means and open the seal.

2. A brake actuator comprising a fluid reservoir, a cylinder having portions of different diameters, the large diameter portion communicating with said reservoir and the small diameter portion being connected to the brake system, a piston assembly comprising connected pistons in said cylinder portions, the piston in the large diameter portion displacing fluid therefrom into the small diameter portion, sealing means for the small diameter piston also constituting a check valve permitting passage of the fluid displaced from the large cylinder portion into the small cylinder portion but preventing movement of the fluid past said sealing means in the opposite direction, actuating means in said reservoir, a member reciprocable in said piston assembly and engaged by said actuating means, sealing means between said piston assembly and member at the end of the latter adjacent the actuating means and a spring engaging said piston assembly and member at the opposite end of the latter, said spring operable to hold said seal closed but adapted to yield and permit said seal to open upon the development of a predetermined pressure in the larger cylinder.

3. A brake actuator comprising a master cylinder having two pistons of different diameter each arranged to create fluid pressure for operating the brakes and both arranged to cooperate at times in producing brake applying pressure; a valve for relieving the pressure created by one of said pistons; a manually operated element controlling one portion of the valve, the valve having a part cooperating with a manually controlled portion of the valve, and means including said pistons and a connection between said pistons and the cooperating part for controlling said cooperating part conjointly by the pressure created by the high pressure piston and the pressure created by the low pressure piston, whereby the valve is actuated to relieve the pressure created by the low pressure piston whenever the sum of the effective pressures reacting on the high pressure piston and on the low pressure piston exceeds a predetermined amount.

4. A brake actuator comprising a master cylinder having a high pressure piston of relatively small diameter and a low pressure piston of relatively large diameter each arranged to create fluid pressure for operating the brakes and both arranged to cooperate at times in producing brake applying pressure; a valve for relieving the pressure created by the low pressure piston and having a first portion controlled by the combined pressure created by the high pressure piston and the pressure created by the low pressure piston; a manually operated element connected to a second portion of the valve, said second portion being movable relative to the first portion; and means including said pistons and a connection between said pistons and the first portion coacting with the first portion to control the valve whereby the valve is actuated to relieve the pressure created by the low pressure piston whenever the total effective pressure reacting against the low pressure piston and against the high pressure piston equals a predetermined amount.

5. A brake actuator comprising connected cylinders of different diameters, the smaller cylinder being connected to the brake system and the larger cylinder being at times connected with the smaller cylinder; a piston structure comprising connected pistons in said cylinders, the piston in the larger cylinder displacing the fluid therefrom into the smaller cylinder at times; means for preventing fluid displaced from the smaller cylinder from passing into the larger cylinder, while permitting passage of fluid in the reverse direction; actuating means for said piston structure, and means comprising a valve for at times relieving the pressure in said larger cylinder and effective to relieve said pressure whenever the total effective pressures acting on said large piston and on said small piston exceeds a predetermined amount, said valve having a member connected to said actuating means which coacts with the piston structure to form the valve.

6. A brake actuator comprising connected cylinders of different diameters, the smaller cylinder being connected to the brake system; a piston structure comprising connected pistons in said cylinders, the piston in the larger cylinder at times displacing the fluid therefrom into the smaller cylinder; means for preventing the fluid displaced from the smaller cylinder to pass the piston therein against the direction of movement thereof while allowing passage of fluid in the reverse direction; actuating means for said pistons; and a member mounted for limited movement relative to the piston structure and engaged by said actuating means, yielding means between said piston structure and one portion of said member, and another portion of said member and said piston structure constituting a seal whereby under low pressure conditions the piston structure may be advanced with the seal closed and upon the development of a predetermined pressure the member may be moved relative to the piston to overcome the yielding means and open the seal.

7. A brake actuator comprising a fluid reservoir; a cylinder having portions of different diameters, the larger diameter portion communicating with said reservoir and the smaller diameter portion being connected to the brake system, a piston assembly comprising connected pistons in said cylinder portions, the piston in the larger diameter portion at times displacing fluid therefrom into the smaller diameter portion, sealing means for the smaller diameter piston also constituting a check valve permitting passage of the fluid displaced from the larger cylinder portion into the smaller cylinder portion but preventing movement of the fluid past said sealing means in the opposite direction, actuating means in said reservoir, a member reciprocable with said piston assembly and engaged by said actuating means, sealing means between said piston assembly and member at the end of the latter adjacent the actuating means and a spring engaging said piston assembly and member at the opposite end of the latter, said spring being operable to hold said seal closed at times but adapted to yield and permit said seal to open upon the development of predetermined pressures.

8. A fluid pressure mechanism of the class described comprising a compound cylinder having large and small bores; a supply reservoir communicating with said cylinder; a piston structure having a piston head in each bore; means for operating said piston structure to create fluid pressures in said bores; a passage through the larger piston head, said passage leading to said supply reservoir; valve means for said passage, said valve means having a portion connected to and controlled by the two piston heads of the piston structure and a portion connected to and controlled by said operating means, the forces exerted on both of said heads acting on the valve means in the same direction to open said valve and thereby gradually relieve the pressure in said larger bore; means for replenishing said cylinder from said reservoir; and a spring for urging said valve to closed position and reacting on the operating means, whereby the valve means is opened or closed depending upon the combined effective pressures acting on said large and small piston heads, and said combined pressures are balanced by the operating pressures so that the reaction on the operator builds up uniformly.

9. A fluid pressure mechanism of the class described comprising a compound cylinder having large and small bores; a supply reservoir communicating with said cylinder; a piston structure having a piston head in each bore each of an effectively different size from the other, means for operating said piston structure to create fluid pressures in said bores; a passage through the larger piston head, said passage leading to said supply reservoir; valve means for said passage; said valve means having a portion connected to and controlled by the two piston heads of the piston structure and a portion connected to and controlled by said operating means, the forces exerted on said both of said piston heads acting on the valve means in the same direction to open said valve and thereby gradually relieve the pressure in said larger bore; means for replenishing said cylinder from said reservoir; and a spring for urging said valve to closed position, whereby the valve is opened or closed depending upon the combined effective pressures acting on said large and small heads, said combined pressures are balanced by the operating pressures so that the reaction on the operator builds up uniformly.

10. A fluid system for transmitting power between a foot pedal or like element and a brake cylinder and acting in several phases with different predetermined ratios of transmission, comprising a piston unit having an effectively large piston and an effectively small piston, means operated by the foot pedal for actuating the piston unit, a cylinder for each of said pistons, duct means between the small cylinder and the brake cylinder, a communication between the small cylinder and the large cylinder, valve means in said communication opening toward the small cylinder, a fluid reservoir, a communication between the large cylinder and the fluid reservoir, a second valve means in said communication, said second valve means opening under the combined effective pressure in said large cylinder and in said small cylinder, and resilient means for urging said second valve toward closed position, and reacting directly on said foot pedal operated means to give a proportionate reaction to the operator.

11. A hydraulic brake system having a liquid supply reservoir; a relatively small diameter high pressure cylinder; a relatively large diameter low pressure cylinder arranged to be connected to said high pressure cylinder and to said reservoir and arranged to discharge at times into said high pressure cylinder; a connection from said high pressure cylinder leading to the braking means; a unitary piston structure having high and low pressure pistons, said member having an axial opening therethrough at times connecting said low pressure cylinder with said reservoir; a valve in said opening controlling the connection; a spring normally holding said valve in closed position, pedal operated means acting on a portion of said valve and through said portion on said spring and through said spring on said piston, said valve being operable by fluid pressure created by a movement of said piston structure including said high pressure and said low pressure piston whereby said valve may be intially opened by the combined pressure acting on said high pressure piston and on said low pressure piston but may be subsequently held open by pressure acting on said high pressure piston; means for reciprocating said piston structure, and a rubber valve cup on the forward face of said high pressure piston for permitting fluid to flow therepast in one direction only.

12. A brake actuator comprising connected cylinders of different diameters, the smaller cylinder having a fluid connection with the brake system and the larger cylinder at times having a fluid connection with the smaller cylinder; a piston structure comprising connected pistons in said cylinders, the piston in the larger cylinder displacing the fluid therefrom into the small cylinder at times; means for preventing fluid displaced from the smaller cylinder from passing into the larger cylinder while permitting fluid to pass in the reverse direction; actuating means for the said piston structure comprising a pedal, an actuating member connected to said pedal and a resilient means interposed between said actuating member and said piston; and means comprising a check valve for at times relieving pressure in said larger cylinder, said check valve being urged towards its seat by the pressure in said larger cylinder but arranged to be moved from its seat by a projection on said actuating member whenever there is relative movement of said actuating member toward said piston member and compression of said resilient member by the resistance of the combined pressures on said larger piston and said smaller piston to force transmitted from the pedal to said actuating member.

13. A brake actuator comprising connected cylinders of different diameters, the smaller cylinder having a fluid connection with the brake system and the larger cylinder at times having a fluid connection with the smaller cylinder; a piston structure comprising connected pistons in said cylinders, the piston in the larger cylinder displacing the fluid therefrom into the small cylinder at times and having an effective area less than the effective area of the piston in the smaller cylinder; means for preventing fluid displaced from the smaller cylinder from passing into the larger cylinder while permitting fluid to pass in the reverse direction; actuating means for the said piston structure comprising a pedal, an actuating member connected to said pedal and a resilient means interposed between said actuating member and said piston; and means comprising a check valve for at times relieving pressure in said larger cylinder, said check valve being urged towards its seat by the pressure in said larger cylinder but arranged to be moved from its seat by a projection on said actuating member whenever there is relative movement of said actuating member toward said piston member and compression of said resilient member by the resistance of the combined pressures on said larger piston and said smaller piston to force transmitted from the pedal to said actuating member, the effective area of said larger piston being less than the effective area of said smaller piston.

14. A brake actuator comprising connected cylinders of different diameters, the smaller cylinder having a fluid connection with the brake system and the larger cylinder at times having a fluid connection with the smaller cylinder; a piston structure comprising connected pistons in said cylinders, the piston in the larger cylinder displacing the fluid therefrom into the small cylinder at times and having an effective area less than the effective area of the piston in the smaller cylinder; means for preventing fluid displaced from the smaller cylinder from passing into the larger cylinder while permitting fluid to pass in the reverse direction; actuating means for the said piston structure comprising a pedal, an actuating member connected to said pedal and a resilient means interposed between said actuating member and said piston; and means comprising a check valve for at times relieving pressure in said larger cylinder, said check valve being urged towards its seat by the pressure in said larger cylinder but arranged to be moved from its seat by said actuating member.

15. A fluid pressure producing device of the class described comprising a cylinder having a double diametral bore providing a large chamber and a relatively small chamber, a reservoir for supplying fluid to said chambers, a discharge port in the small chamber, a piston reciprocable in each chamber, means connecting said pistons, by-pass means permitting flow of fluid past the smaller piston in one direction only during advancement of said pistons, a passage through the larger piston connecting the larger chamber with the reservoir, a thrust receiving part movable relative to said pistons, means for exerting a thrust on said part to advance said pistons and create fluid pressures in said chambers, a spring interposed between said part and said pistons and receiving said thrust, said spring being acted upon by the reactions exerted on said pistons by the fluid pressures in said chambers, said spring being adapted to yield under a predetermined reaction, and normally closed valve means for said passage, said valve means being opened responsive to movement of said part relative to said pistons as a result of yielding of said spring to thereby relieve the fluid pressure in the large chamber.

16. A fluid pressure producing device of the class described, comprising a cylinder having a double diametral bore providing a large chamber and a relatively small chamber, a reservoir for supplying fluid to said chambers, a discharge port in the small chamber, a piston reciprocable in each chamber, means connecting said pistons, by-pass means permitting flow of fluid past the smaller piston in one direction only during advancement of said pistons, a passage through the larger piston connecting the larger chamber with the reservoir, a valve normally closing said passage, said passage being opened by movement of said valve in the direction of advancement of said pistons to create pressure in said chambers, a spring interposed between said valve and said pistons and normally holding said valve closed, said spring being acted upon by the reactions exerted on said pistons by the fluid pressures in said chambers and yielding under a predetermined reaction to permit relative movement between the pistons and said valve to open the valve and relieve the fluid pressure in the larger chamber and means for applying force to said valve to advance said pistons.

JOHN WILLIAM WHITE.